Patented Jan. 27, 1931

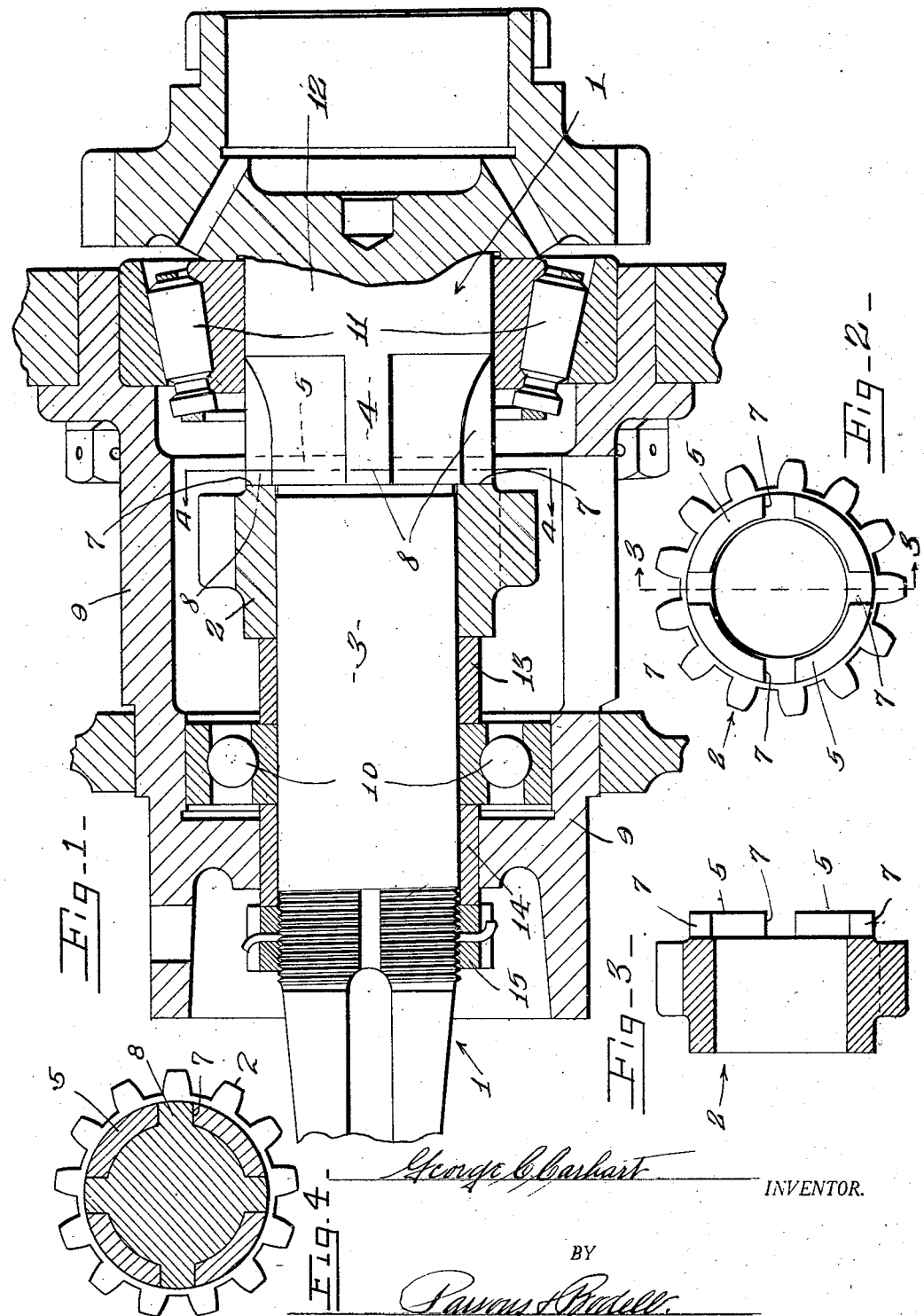

1,790,261

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

MEANS FOR KEYING GEARS TO SHAFTS

Application filed October 23, 1923. Serial No. 670,375.

This invention has for its object a particularly simple and efficient construction by which a gear having a relatively large bore or a gear which is of comparatively small diameter relatively to the shaft on which it is mounted, is locked or keyed to the shaft without cutting or weakening the gear between the bore and the teeth.

The invention consists in the novel features and in the combinations and constructions hereinafter set forth and claimed.

In describing this invention, reference is had to the accompanying drawings in which like characters designate corresponding parts in all the views.

Figure 1 is an elevation of a shaft partly in section of a structure embodying my invention, the gear on the shaft being shown in section, and the support for the shaft being shown in section.

Figure 2 is an end view of the gear.

Figure 3 is a sectional view taken on line 3—3, Fig. 2.

Figure 4 is a section at right angles to the plane of Figure 1. the section being taken through member 7.

This invention comprises generally a shaft, a gear mounted on the shaft and means located external of the gear for locking or keying the gear to the shaft.

1 designates the shaft and 2 the gear of relatively small diameter mounted on the shaft, the shaft being formed with a cylindrical portion 3 which fits the cylindrical bore of the gear 2. The bore of the gear 2 is comparatively large, so that it extends close to the toothed surface of the gear and, hence, the cutting of keyways in the gear would weaken the gear.

The means external of the gear for keying it to the shaft, as here shown, comprises a splined portion 4 at one side of the cylindrical portion 3 of the shaft on which the gear is mounted and an annular flange 5 on one side of the gear, the flange lapping or encircling the splined portion and being formed with notches 7 for receiving the splines 8 or the ends thereof, on the splined portion 4 of the shaft.

The splined portion 4 is of slightly greater diameter than the cylindrical portion 3. The gear 2 of the comparatively large bore is mounted on the cylindrical portion of the shaft 1 and the torque is transmitted through an annular flange 5 and the splines 8.

The shaft 1, as here shown, is mounted in a support 9 having spaced apart bearings 10, 11 engaging the cylindrical portions 3 and 12 of the shaft 1 on opposite sides of the splined portion 4; and the gear 2, as here shown, is held from endwise movement out of engagement with the splined portion by means of a sleeve 13 interposed between the gear 2 and the bearing 10 and a sleeve 14 interposed between the bearing 10 and a nut 15 threading on the outer end of the shaft.

As clearly seen in the drawing, the shaft 3 is the stem of the driving gear of a conventional change speed transmission gearing in which the bearing 11 for the shaft or stem is supported in the front wall of the usual gear housing and projects in advance of the gear housing, and the support 9 is detachably secured as by cap screws to the wall of the gear housing, this support being tubular in general form.

The shaft 1, as here shown, is the driving shaft of a change speed transmission gearing and is formed with a spur gear at its inner end for coacting with a gear of a change speed transmission gearing in which a shaft 1 is incorporated.

By my invention, a gear of comparatively small diameter can be mounted upon a shaft and keyed thereto without weakening the gear by cutting or interrupting the continuity of the bore of the gear.

What I claim is:

The combination with the wall of a gear casing, a bearing in said wall, a shaft journalled in the bearing and projecting through the wall, the shaft having its end remote from said wall threaded, a support detachably mounted on said wall and projecting therefrom, a bearing for the shaft located in the support and spaced apart from the former bearing and having an axial shifting movement in the support, a gear mounted on the shaft within the support and between the bearings, the gear and the shaft having means for interlocking and keying the gear to the shaft upon relative axial movement of the gear and the shaft, and means for holding the gear in position and also holding the axially shiftable bearing from movement, said means comprising a nut threading on the outer end of the shaft and spacers between the nut and the shiftable bearing and between the shiftable bearing and the opposing end of the gear.

In testimony whereof, I have hereunto signed my name, at Syracuse, in the county of Onondaga, and State of New York, this 17th day of October, 1923.

GEORGE C. CARHART.